United States Patent [19]

Vogler

[11] 4,376,894
[45] Mar. 15, 1983

[54] DEVICE FOR DRIVING A ROTARY-ANODE X-RAY TUBE

[75] Inventor: Gerd Vogler, Hamburg, Fed. Rep. of Germany

[73] Assignee: U.S. Philips Corporation, New York, N.Y.

[21] Appl. No.: 344,700

[22] Filed: Feb. 1, 1982

[30] Foreign Application Priority Data

Feb. 4, 1981 [DE] Fed. Rep. of Germany ....... 3103630

[51] Int. Cl.³ .......................... H02P 7/42; H05G 1/66; H05G 1/70
[52] U.S. Cl. .................................. 378/110; 318/727
[58] Field of Search ................ 250/406; 318/727, 729, 318/732

[56] References Cited

U.S. PATENT DOCUMENTS 4,259,580  3/1981  Vogler .............................. 250/406

Primary Examiner—Alfred E. Smith
Assistant Examiner—T. N. Grigsby
Attorney, Agent, or Firm—Robert T. Mayer; Bernard Franzblau

[57] ABSTRACT

The invention relates to a drive system for a rotary-anode X-ray tube which comprises an asynchronous motor. The current through the stator windings is generated by two pulse-width modulators to which sinusoidal signals which are phase-shifted 90° with respect to one another are supplied by a sine and a cosine memory. The amplitude thereof is controlled in dependence on the amplitude of the current through the relevant stator winding.

5 Claims, 4 Drawing Figures

DEVICE FOR DRIVING A ROTARY-ANODE X-RAY TUBE

The invention relates to a device for driving a rotary-anode X-ray tube, comprising an asynchronous motor having stator windings that are fed with an alternating current of predetermined frequency, each time via a switching amplifier.

A device of this kind is known from German Auslegeschrift No. 20 53 077. The switching amplifiers thereof form part of a d.c./a.c. converter which generates two square-wave voltages having a controlled frequency and a duty-cycle of 1:1 for feeding the single-phase asynchronous motor comprising main and auxiliary stator windings, said square-wave voltages being shifted one quarter period in time with respect to one another. The frequency is varied in accordance with the variation of the pull-out torque of the asynchronous motor.

It is a drawback of the known device that the square-wave voltages produce harmonics in the current through the stator windings which reduce the efficiency. The amplitude of the alternating current through the stator windings cannot be controlled and depends on the relevant frequency because the impedance of the stator winding depends on that frequency.

Also known are rotary-anode drive devices which generate two sinusoidal alternating voltages with a phase-shift of 90° with respect to one another. However, these devices are designed for operation with a fixed frequency.

It is an object of the invention to provide a device of the kind set forth in which substantially sinusoidal alternating voltages having a predetermined frequency and amplitude are produced in the stator windings.

To this end, the device in accordance with the invention is characterized in that:

(a) each switching amplifier is controlled by a pulse-width modulator that produces an output signal having a high pulse frequency in comparison with the motor speed, (b) for each stator winding there is provided an alternating voltage generator, the various alternating voltage generators generating phase-shifted sinusoidal alternating voltages, (c) for each stator winding there is provided a measuring member for measuring the current through the stator windings, the output signal of said member being compared with a reference value in a comparison circuit, (d) the output of the alternating voltage generator is connected to an input of the pulse-width modulator, at least the amplifier, the measuring member and the comparison circuit forming a control loop for reducing the difference between the reference value and the output signal of the measuring member.

The pulse-width modulator converts the sinusoidal signals of the alternating voltage generator into a square-wave voltage having a fixed period and a duration which depends on the instantaneous value of the sinusoidal signal. This voltage is amplified by the switching amplifier. The output signal of the switching amplifier can be applied directly to the stator windings because the carrier frequency determined by the period of the pulse-width modulator for generating the square wave voltage is substantially higher than the resultant drive frequency of the asynchronous motor. Consequently, the stator windings behave almost completely as an inductance and the current through the windings is proportional to the integral of the square-wave voltages. Merely for the protection against inadmissible radio interference, either the stator cable is shielded or, preferably, an LC smoothing filter is inserted in each output of the switching amplifier. The current through each stator winding is measured by a measuring member, for example, a current transformer and is compared with a predetermined reference value in a comparison circuit. The pulse duration is controlled by feedback from the comparison circuit to the alternating voltage generator or the pulse-width modulator so that the difference between the reference value and the actual value of the current through the stator windings is minimized. For example, if the current through a stator winding is too large, the amplitude of the sinusoidal alternating voltage applied to the pulse-width modulator will be reduced via the comparison circuit.

The alternating voltage generators per se have to deliver only a comparatively small electric power. Alternating voltage generators for sinusoidal alternating voltages having a controllable frequency and comparatively low output powers can be manufactured comparatively simply and inexpensively.

A further embodiment of a device in accordance with the invention is characterized in that each alternating voltage generator comprises a digital circuit for generating a digital signal which corresponds to a sine function or a cosine function, the output of the digital circuit being connected to an input of a digital-to-analog converter.

A further preferred embodiment of the drive device in accordance with the invention is characterized in that the digital-to-analog converters are multiplying digital-to-analog converters, an analog input of which receives the output signal of the associated comparison circuit. The amplitude of the alternating voltage at the output of the digital-to-analog converter can be simply controlled, and hence also the amplitude of the current through the stator windings.

A further embodiment of the device in accordance with the invention is characterized in that the digital circuits comprise read-only memories in the storage positions of which there are stored the values of a cosine function or a sine function, the values stored being addressed by a cyclical counter which is coupled to the address inputs of the read only memory and which is controlled by a clock generator. The frequency of the clock generator is controlled by means of a control device. The frequency of the sinusoidal alternating voltage is then varied by variation of the frequency of the clock signals which control the cyclical counter. The clock frequency is then n times higher than the frequency of the sinusoidal alternating voltage, n being the integer number representing the maximum count of the cyclical counter.

A further embodiment of a device in accordance with the invention is characterized in that the control device comprises a comparator circuit for comparing the actual speed value of the rotary anode with a predetermined reference value and for adding to or subtracting from the actual value of the speed a threshold value which corresponds to the slip rotor speed when the actual value exceeds or drops below the reference value, respectively, by a predetermined threshold value, and for applying the signal thus formed to the control input of the clock generator as a control variable. The frequency of the current in the stator windings is then always higher or lower than the actual value of the rotor speed by an amount corresponding to the slip speed, depending on whether the reference value of the speed is larger or smaller than the actual value of the speed increased or decreased by a predetermined value. Consequently, the acceleration and deceleration of the rotor and the rotary anode always occur with the largest torque. It is particularly attractive that only two values have to be preset (the reference speed and the slip number of revolutions), even though the frequency of the current in the stator windings must be continuously varied. This holds good regardless of the actual construction of the alternating voltage generator.

The invention will be described in detail hereinafter with reference to the accompanying drawings in which.

Figure 1:
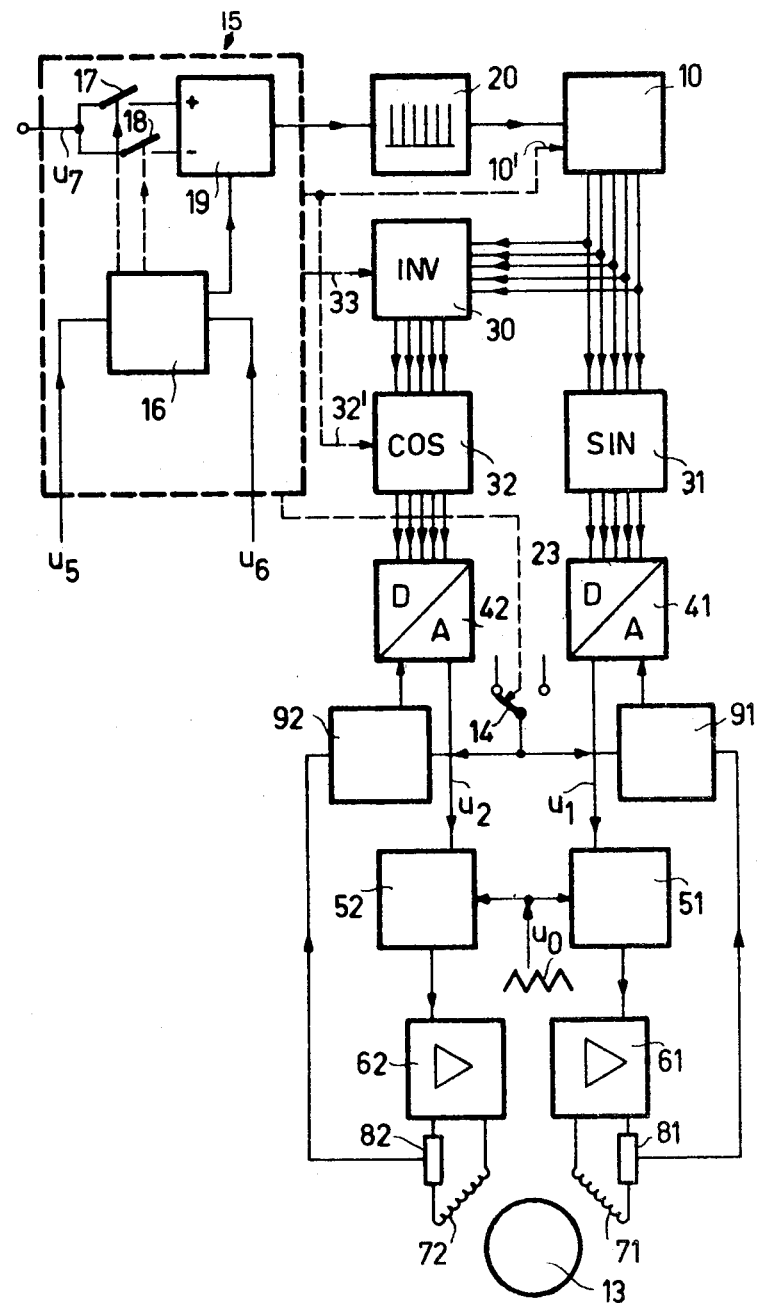
FIG. 1 shows a block diagram of a device in accordance with the invention.

The reference numeral 10 in FIG. 1 denotes a modulo-32 counter which counts the clock pulses of the voltage-controlled clock generator 20. The 32-counter reaches the same position after every 32 clock pulses and its output signal is applied in parallel to the address inputs of a programmable read-only memory 31. In 32 successive memory locations of the read-only memory 31 there is stored a sine function whose values are cyclically addressed by the counter position and are converted, via a multiplying digital-to-analog converter 41, into an analog signal which is substantially sinusoidal in time.

Similarly, the counter position of the binary counter 10 controls, via a digital inverter circuit 30, a read-only memory 32 which may have the same content and method of addressing as the read-only memory 31 but in which the values of a cosine function are stored. The inverter circuit 30, in its simplest form, may consist of a switch and one known inverter circuit. The inverter circuit then connects the most significant bit (MSB) line from counter 10 to memory 32 if a minus cosine function is to be generated. Otherwise, the MSB line of counter 10 is connected to memory 32 via said switch. The values stored in digital form are converted into an analog signal which varies cosinusoidally in time by means of a further multiplying digital-to-analog converter 42, so that the output voltages of the digital-to-analog converters 41 and 42 are phase shifted 90° with respect to one another. The digital inverter 30 can be controlled via the control line 33, which is denoted by broken lines, so that it either applies the counter position of the counter 10 in unmodified form to the read-only memory 32 or adds (modulo-32) the value 16 thereto. The modulo-32 addition of the value 16 can be simply performed by inversion of the output line of the counter 10 which carries the most significant bit ($2^4$). Thus, cosine values shifted through 180° (i.e. of opposite phase) can be addressed so that the output voltage of the digital-to-analog converter 42 can be inverted via the control line 33. Instead of the cosine read-only memory 32, use can alternatively be made of a sine read-only memory if the value 8 is added to the counter position before it is applied to the address inputs of the sine read-only memory.

Each of the output signals $u_1$ and $u_2$ of the digital-to-analog converters 41 and 42, respectively, is applied to a pulse-width modulator 51 and 52, respectively, the modulation inputs of which receive a delta voltage $u_o$. The frequency of the delta voltage $u_o$ (for example 20 kHz) is high in comparison with the highest frequency of the signals $u_1$, $u_2$ and the amplitude of the voltage $u_o$ is higher than the amplitude of the signals $u_1$, $u_2$.

Figure 2A:
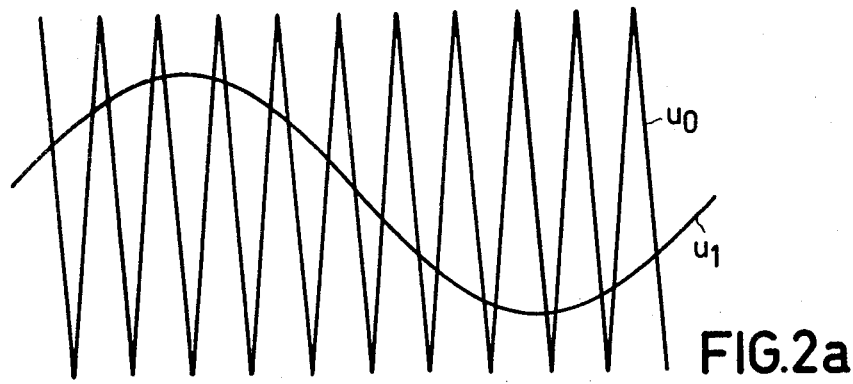
FIG. 2a and 2b show the variation in time of the input and output voltages of a pulse-width modulator.
Figure 2B:
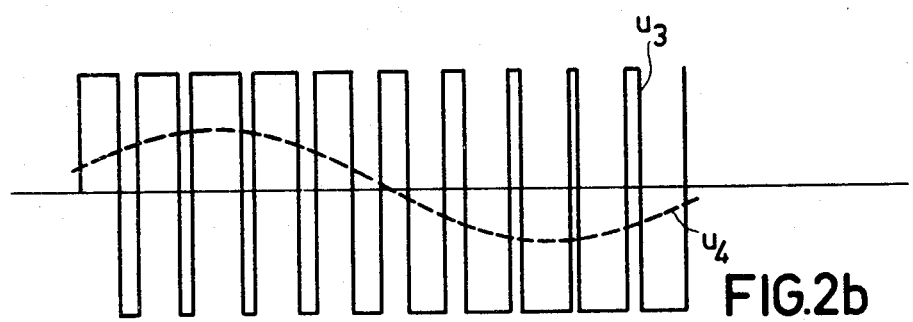

FIG. 2a shows the variation in time of the voltages $u_1$ and $u_o$. However, it is to be noted that the ratio of the frequencies of the voltage $u_o$ and the voltage $u_1$ is actually much larger. If the associated pulse-width modulator (51) is, for example, a comparator whose output voltage is positive if the voltage $u_1$ is positive with respect to the voltage $u_o$ and whose output voltage is negative if the voltage $u_1$ is negative with respect to the voltage $u_o$, the square-wave, pulse-width modulated voltage which is denoted by the reference $u_3$ in FIG. 2b arises as the output voltage of the pulse-width modulator 51. The mean value in the time of said voltage $u_3$ is denoted by broken lines $u_4$ in FIG. 2b (calculated over the duration of one period of the square-wave voltage).

The output voltages of the pulse-width modulators 51 and 52 are applied to switching amplifiers 61 and 62 (FIG. 1), the non-smoothed output voltage of which has the same variation in time as the output voltage of the preceding pulse width modulators. The switching amplifiers may have a construction as described in German Auslegeschrift No. 20 53 077. Each switching amplifier consists of four controllable switching elements in a bridge connection, at least two switching elements thereof which are present in oppositely situated branches being conductive while the other two elements are blocked. The control inputs of the switching elements can be coupled to the outputs of the pulse-width modulators, possibly via a transfer member, e.g. an opto-coupler (not shown) for providing the potential separation. Steps must then be taken in order to prevent all switching elements from being simultaneously conductive. For the switching elements one can use transistors, notably so-called Power-MOS-FETs or GTO thyristors.

The two stator windings 71 and 72 of a single-phase asynchronous motor are connected to the outputs of the two switching amplifiers 61 and 62, respectively, and the rotor 13 of the motor is rigidly connected to the rotary anode of the X-ray tube (not shown). Connection may be via a smoothing filter. However, the stator windings may also be directly connected to the outputs of the switching amplifiers because the impedances of the stator windings are for the most part inductive at the switching frequencies so that the current through the winding corresponds to the time integral of the modulated square-wave voltage. The currents flowing through the stator windings 71 and 72 are measured by current measuring members 81 and 82, respectively, for example, a current transformer, and is applied to the inputs of a comparison circuits 91 and 92, respectively. A further input of the comparison circuits 91 and 92 receives a switchable reference value for the current through the relevant stator winding via a switch 14. The comparison circuits 91 and 92 compare the reference values with the peak values of the currents through the stator windings (to this end, the comparison devices 91 and 92 may each comprise a peak value rectifier) and each comparison circuit produces an output signal which corresponds to the difference between the two values. The output signals are applied to the multiplying digital-to-analog converters 41 and 42 as reference voltages so that the output signals thereof correspond to the product of the digital output signals of the read-only memories 31 and 32 and the analog output signals of the comparison circuits 91 and 92. The polarity of the output signals of the comparison circuits 91 and 92 is chosen so that the current through the stator windings is controlled to the reference value predetermined by means of the switch 14. Such current control ensures that the current through the stator windings 71, 72 remains independent of the frequency of the alternating voltages at the outputs of the digital-to-analog converters 41 and 42, in spite of the frequency-dependent impedance thereof.

The variable frequency clock generator 20 may be, for example, a voltage/frequency converter in which a linear relationship exists between input voltage and clock frequency. In that case it is merely necessary to vary the input voltage of the clock generator 20 in order to vary the frequency of the sinusoidal output signal. The input voltage should always be in agreement with the desired rotor speed. To this end, there is provided a control device 15 which comprises a comparator circuit 16 which compares the reference value $u_5$ of the speed of the rotary anode with the value $u_6$ of the actual rotor speed. The number of revolutions can be directly measured as disclosed in U.S. Pat. No. 3,214,589 and can be converted into an actual value signal $u_6$ which is proportional thereto. However, indirect measurement is alternatively possible, for example, as disclosed in German Offenlegungsschrift No. 27 32 852. Depending on the kind of examination, the reference value $u_5$ can be derived from one of the various potentiometers or be generated by a microprocessor. The comparator circuit 16 may comprise two threshold value circuits which ensure that the switch 17 is closed when the reference value $u_5$ increased by the threshold value exceeds the actual value $u_6$, and which also ensure that the switch 18 is closed when the reference value $u_5$ increased by the threshold value is smaller than the actual value $u_6$. If the difference between the reference value $u_5$ and the actual value $u_6$ is smaller than the threshold value, both switches 17 and 18 are open. The switches 17 and 18 are connected to a voltage source which supplies a direct voltage (threshold value) $u_7$ which is proportional to the slip, the quotient of the direct voltage and the slip being equal to the quotient of the voltage $u_6$ and the actual value of the speed. The slip is the difference between the frequency of the current in the stator windings and the rotor speed at which the highest possible torque is exerted on the rotor of the asynchronous motor. The slip is substantially constant for a predetermined rotor-stator configuration.

The threshold value $u_7$ which is proportional to the slip is added to the actual value $u_6$ in a superposition circuit 19 if the switch 17 is closed, i.e. if the reference value $u_5$ increased by the threshold value is larger than the voltage $u_6$. The value $u_7$ is subtracted from the actual value $u_6$ if the switch 18 is closed, i.e. if the actual value $u_6$ increased by the threshold value is larger than the reference value $u_5$. The output of the superposition circuit 19 then carries a signal which in turn is proportional to the sum $(u_6+u_7)$ or the difference $(u_6-u_7)$ which is converted into a clock frequency which is proportional thereto by the clock generator 20. In these cases, occurring when suddenly an essentially higher or lower reference is desired, the clock frequency is controlled so that the frequency of the sinusoidal alternating voltage signals $u_1$ and $u_2$ exceeds the actual speed at the instant by a slip frequency corresponding to the slip speed, so that the torque acting on the rotor has its highest value and the rotor is accelerated or decelerated to the desired speed in the shortest possible period of time. In the other cases, the difference between the rotor speed and the frequency of the stator current is substantially zero so that no acceleration or deceleration torque can arise and the rotor with the rotary anode maintains a substantially constant speed. In order to avoid drift in such a case, it is advantageous to ensure that the value applied to the superposition circuit 19 follows the reference value $u_5$ of the speed, instead of the actual value $u_6$.

Figure 3:
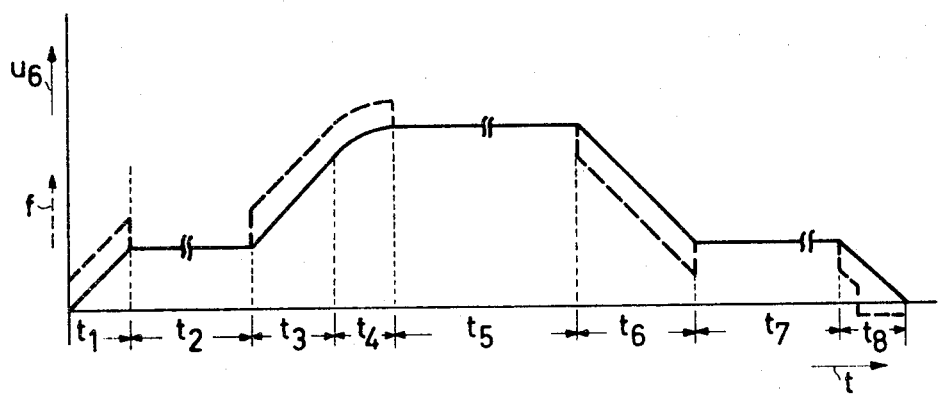
FIG. 3 shows the variation in time of the rotor speed and the frequency of the current through the stator windings during an X-ray examination.

FIG. 3 shows, as a function of time t, the variation of the speed or the voltage $u_6$ in solid lines, and the variation of the frequency f of the current in the stator windings in broken lines. The variation of the frequency f corresponds to the variation of the voltage at the input of the clock generator 20 or the clock frequency for a typical X-ray examination.

During the time interval $t_1$, the rotor is accelerated to a predetermined first speed, for example, 2,700 revolutions per minute. During the acceleration, the reference value $u_5$ corresponding to this speed is always larger than the actual value $u_6$ so that the comparator circuit 16 closes the switch 17 and the value $u_7$ which is proportional to the slip speed is added to the actual value $u_6$. Consequently, the frequency f of the current in the stator windings constantly exceeds the rotor speed substantially by the slip speed so that the rotor is accelerated to the desired speed in the shortest period of time. When this speed is reached, $u_5=u_6$ and the switch 17 is opened again. The output voltage of the superposition circuit 19 then corresponds to the actual value $u_6$ and the rotor continues to run at substantially the same frequency. Because the drive energy required for this purpose (for example, 40 W) is substantially smaller than the energy required for acceleration (being in the order of magnitude of kW), the stator current must be reduced in order to reduce the dissipation in the stator windings. To this end, the reference value of the stator current is switched over from a high value to a substantially lower value by means of the switch 14. The switch 14 is controlled (in a manner not shown) by the control device 15 via the line 23, exclusively when the switch 17 as well as the switch 18 is open. Since control device 15 should generate a control signal for switch 14 when switches 17 and 18 are open, the output lines of comparator circuit 16 which control switches 17 and 18 are also connected to the inputs of a NOR gate (not shown), the output of which controls switch 14. The frequency of the current in the stator windings then corresponds substantially to the speed. This operating condition is maintained during the period $t_2$.

It is assumed that at the end of the period $t_2$ an X-ray exposure is made for which a larger number of revolutions, for example, 8000 revolutions per minute is required. The reference value $u_5$ is then substantially larger than the actual value $u_6$ again so that the switch 17 is closed and the sum of the values $u_7$ and $u_6$ appears at the output of the superposition device 19. At the same time the switch 14 is switched over to the larger reference value for the stator current. The increase of the stator current and the increase of the frequency of the stator current cause acceleration of the rotor and the speed increases (period $t_3$). Because the impedance of the stator windings increases as the frequency of the current in the stator windings increases, an instant can be reached where the current through the stator windings no longer reaches the predetermined reference value. The speed slowly increases after that instant (period $t_4$) until the reference value of the speed is reached. The switch 17 is then opened and the switch 14 is switched over to the lower reference value again. The rotor then rotates at substantially the speed reached (period $t_5$).

If this operation is to be followed, for example, by fluoroscopy for which a lower speed is used, the reference value $u_5$ is reduced to the smaller value at the end of the period $t_5$. Because this value is then substantially smaller than the actual value $u_6$ of the speed, the switch 18 is closed while the switch 14 is switched over to the higher reference value again. The superposition circuit 19 then supplies a signal which is proportional to the difference between the actual value and the threshold value ($u_6-u_7$), so that the frequency of the current in the stator windings is always smaller than the speed of the rotor by an amount which equals the slip. The rotor is thus decelerated with the highest possible deceleration so that the speed of the rotor decreases and the frequency of the current decreases, etc. When the desired lower speed is reached, the reference value $u_5$ equals the actual value $u_6$ again, the switch 18 is opened and the switch 14 is switched over to the lower reference value of the stator current so that the rotor continues to rotate at the speed reached (period $t_7$).

If the examination is subsequently to be terminated, the speed zero is taken as the reference value $u_5$. Consequently the switch 18 is closed and the switch 14 is switched over so that the output signal of the superposition circuit 19 again corresponds to the difference $u_6-u_7$ and the speed decreases. This decrease is also followed by the frequency in the stator windings which, however, is smaller than the actual speed by an amount which equals the slip. When the frequency of the stator current reaches a limit value (preferably smaller than the number of slip revolutions) at which operation without complex circuits is still possible, for example, 10 Hz, the input voltage of the clock generator 20 is maintained constant at the value reached as from this instant in a known manner (not shown), so that the frequency of the current in the stator winding no longer changes. At the same time, by control via the control line 33, all output signals of the digital inverter circuit 30 are inverted so that the cosine oscillation $u_2$ at the output of the digital-to-analog converter 42 is replaced by a -cosine oscillation $u_2$. Consequently the field of rotation is reversed, which causes a further deceleration of the rotor. Thus, when the RPM of rotor 13 reaches the limit value, then inverter 30 is activated. Therefore, control device 15 may include a further comparator to which are applied the signal $u_6$ and a reference voltage corresponding to said limit value. The output of this further comparator controls the inverter 30 and also controls a switch (not shown) by means of which the clock generator 20 is directly connected to the constant voltage $u_7$. When the speed zero is reached ($u_6=0$), a reset pulse is supplied to a reset input 10' of the counter 10 so that the counter position, and hence also the output of the sine read-only memory 31, are made zero. At the same time, a reset signal is supplied to a reset input 32' of the cosine read-only memory 32 so that the binary output signal thereof or the output signal of the digital-to-analog converter 42 also becomes zero. In order to provide the reset pulse for counter 10 and read-only memory 32, control device 15 may comprise a further comparator to which are applied the signal $u_6$ and a reference voltage of zero volts. The reset pulse will appear at the output of this further comparator. The current in the two stator windings 71 and 72 is then zero, i.e. at the moment of standstill of the rotor 13 there no longer is an accelerating or decelerating magnetic field so that the rotor 13 definitely stops.

When the described device is to be used for driving X-ray tubes whose asynchronous motor has a different rotor-stator configuration or whose anode disc has a different moment of inertia, in any case a different slip speed or a different threshold value $u_7$ must be adjusted so that a different reference value for the current through the stator windings occurs during acceleration (deceleration).

The control device 15 can be constructed by means of a microprocessor to which the actual value of the speed is applied in digital form and which itself delivers the speed in advance in a reaction to different instructions ("exposure", "fluoroscopy" etc.). The counter 10 and the digital inverter circuit 30 can then also be realized by means of the microprocessor. If desired, the clock generator 20 can alternatively consist of a standard frequency generator whose frequency is substantially higher than the clock frequency and which is followed by a controllable frequency divider.

What is claimed is:

1. In a device for driving a rotary-anode X-ray tube comprising an asynchronous motor having stator windings each supplied with an alternating current of predetermined frequency via a respective switching amplifier, the improvement comprising:
   (a) a pulse width modulator for controlling a respective switching amplifier, the pulse-width modulator producing an output signal having a high pulse frequency in comparison with the motor speed,
   (b) an alternating voltage generator for each stator winding, the various alternating voltage generators generating output phase-shifted sinusoidal alternating voltages,
   (c) a current measuring member for each stator winding for measuring the current through the stator windings, an output signal of said current measuring member being compared with a reference value signal in a comparison circuit,
   (d) means connecting the output of an alternating voltage generator to an input of the pulse-width modulator, at least the switching amplifier, the current measuring member and the comparison circuit forming a control loop for reducing the difference signal between the reference value signal and the output signal of the current measuring member.

2. A device as claimed in claim 1, wherein each alternating voltage generator comprises a digital circuit for generating a digital signal which corresponds to a sine function or a cosine function, and means connecting an output of the digital circuit to an input of a digital-to-analog converter.

3. A device as claimed in claim 2 wherein the digital-to-analog converters comprise multiplying digital-to-analog converters having an analog input which receives an output signal of an associated comparison circuit.

4. A device as claimed in claim 2 wherein the digital circuits comprise read-only memories having memory locations in which are stored the values of a cosine or a sine function, respectively, the values stored being addressed by means of a cyclical counter coupled to address inputs of the read-only memory, said counter being controlled by a clock generator, the frequency of the clock generator being controlled by a control device.

5. A device as claimed in claim 4 wherein the control device comprises a comparator circuit for comparing an actual value signal corresponding to the actual speed of the rotary anode with a predetermined reference value signal and for adding to or subtracting from the actual value signal a threshold voltage value which corresponds to the motor slip when the actual value signal exceeds or drops below the reference value signal, respectively, by a predetermined threshold voltage value, and for applying the signal thus formed to a control input of the clock generator as a frequency control variable.

* * * * *